United States Patent
Kollur

(10) Patent No.: US 9,479,448 B2
(45) Date of Patent: Oct. 25, 2016

(54) METHODS FOR IMPROVED PROVISIONING OF INFORMATION TECHNOLOGY RESOURCES AND DEVICES THEREOF

(71) Applicant: Wipro Limited, Bangalore (IN)

(72) Inventor: Srinivas Kollur, Bangalore (IN)

(73) Assignee: Wipro Limited, Bangalore (IN)

( * ) Notice: Subject to any disclaimer, the term of this patent is extended or adjusted under 35 U.S.C. 154(b) by 313 days.

(21) Appl. No.: 13/841,400

(22) Filed: Mar. 15, 2013

(65) Prior Publication Data

US 2013/0262684 A1   Oct. 3, 2013

(30) Foreign Application Priority Data

Apr. 2, 2012 (IN) .......................... 1315/CHE/2012

(51) Int. Cl.
| | | |
|---|---|---|
| *G06F 15/18* | (2006.01) | |
| *G06F 17/30* | (2006.01) | |
| *G06F 9/46* | (2006.01) | |
| *G06F 9/44* | (2006.01) | |
| *H04L 12/911* | (2013.01) | |
| *H04L 12/24* | (2006.01) | |

(52) U.S. Cl.
CPC ........... *H04L 47/70* (2013.01); *H04L 41/0826* (2013.01); *H04L 41/0883* (2013.01); *H04L 41/145* (2013.01)

(58) Field of Classification Search
CPC ........... G06Q 10/06; G06Q 10/06398; H04L 41/145; H04L 41/0883; H04L 41/0826; H04L 47/70
USPC ........................................................ 709/226
See application file for complete search history.

(56) References Cited

U.S. PATENT DOCUMENTS

| | | | |
|---|---|---|---|
| 6,490,587 B2 * | 12/2002 | Easty | .................. G06F 17/3089 |
| 7,111,297 B1 | 9/2006 | Sankaranarayan et al. | |
| 7,660,731 B2 | 2/2010 | Chaddha et al. | |
| 7,904,909 B1 | 3/2011 | Reiner et al. | |
| 8,001,247 B2 * | 8/2011 | Salevan | .............. G06F 11/3442 |
| | | | 709/226 |
| 8,015,048 B2 | 9/2011 | Bullock et al. | |
| 8,127,010 B2 | 2/2012 | Sinha | |

(Continued)

FOREIGN PATENT DOCUMENTS

| | | |
|---|---|---|
| CN | 20098125113 A | 4/2009 |
| JP | 2005301379 A | 10/2005 |

(Continued)

*Primary Examiner* — Kevin Bates
*Assistant Examiner* — Golam Mahmud
(74) *Attorney, Agent, or Firm* — LeClairRyan, a Professional Corporation

(57) ABSTRACT

A method, non-transitory computer readable medium, and information technology (IT) resource optimization apparatus that improves the provisioning of IT resources includes obtaining for each of a plurality of users of IT resources, demographic attributes and an entitlement record comprising an indication of an assigned one or more of the IT resources. For each of the demographic attributes, which of one or more of the IT resources assigned to a threshold number of the plurality of users sharing the demographic attribute are identified. For each of the plurality of users, a recommended provisioning profile is generated based on the identified IT resources. For one or more of the plurality of users, provisioning recommendation(s) are determined based on a comparison of the recommended provisioning profile for the one or more users to the entitlement record for the one or more users. The determined provisioning recommendation(s) are output.

21 Claims, 3 Drawing Sheets

(56) References Cited

U.S. PATENT DOCUMENTS

| | | | |
|---|---|---|---|
| 8,141,090 B1 | 3/2012 | Graupner et al. | |
| 8,402,110 B2* | 3/2013 | Meijer | H04L 67/32 709/217 |
| 8,601,010 B1* | 12/2013 | Felton | G06Q 10/087 707/758 |
| 8,886,788 B2* | 11/2014 | Tung | G06F 9/5072 709/224 |
| 8,996,549 B2* | 3/2015 | Finnigan | G06F 17/30867 707/758 |
| 2003/0055749 A1 | 3/2003 | Carmody et al. | |
| 2008/0028218 A1 | 1/2008 | Simon | |
| 2008/0227063 A1* | 9/2008 | Kenedy | G06Q 40/00 434/219 |
| 2008/0243921 A1 | 10/2008 | Ellisor | |
| 2008/0270561 A1* | 10/2008 | Tang | G06Q 30/02 709/207 |
| 2008/0288330 A1* | 11/2008 | Hildebrand | G06Q 10/06 705/7.28 |
| 2008/0306797 A1 | 12/2008 | Fayaz et al. | |
| 2009/0031286 A1 | 1/2009 | Yee et al. | |
| 2009/0049174 A1* | 2/2009 | Rudnik | G06F 9/44505 709/226 |
| 2009/0113397 A1 | 4/2009 | Wright, Sr. | |
| 2009/0150981 A1* | 6/2009 | Amies | H04L 67/02 726/5 |
| 2010/0005471 A1* | 1/2010 | Jethani | G06F 11/079 718/104 |
| 2010/0058334 A1 | 3/2010 | Mohindra et al. | |
| 2010/0192212 A1* | 7/2010 | Raleigh | G06Q 10/06375 726/7 |
| 2011/0022653 A1* | 1/2011 | Werth | H04L 67/34 709/202 |
| 2011/0087601 A1 | 4/2011 | Apte et al. | |
| 2012/0053982 A1* | 3/2012 | Treacey | G06Q 10/0635 705/7.28 |
| 2012/0078725 A1* | 3/2012 | Maitra | G06Q 30/0269 705/14.66 |
| 2012/0179822 A1* | 7/2012 | Grigsby | G06F 9/5072 709/226 |
| 2012/0203773 A1 | 8/2012 | Shiralkar et al. | |
| 2012/0246098 A1* | 9/2012 | Chari | G06F 21/604 706/12 |
| 2012/0317135 A1* | 12/2012 | Jin | G06F 17/30165 707/769 |
| 2013/0096980 A1* | 4/2013 | Basavapatna | G06Q 10/00 705/7.28 |
| 2014/0181003 A1* | 6/2014 | Kling | G06F 17/30592 707/600 |
| 2014/0289846 A1* | 9/2014 | Moloian | G06F 21/604 726/21 |
| 2015/0317594 A1* | 11/2015 | Reznik | G06Q 10/06 705/7.15 |

FOREIGN PATENT DOCUMENTS

| | | |
|---|---|---|
| JP | 2005301465 A | 10/2005 |
| JP | 2007026077 A | 2/2007 |
| JP | 2008015845 A | 1/2008 |
| JP | 2010113392 A | 5/2010 |
| WO | 2011044681 A1 | 4/2011 |

* cited by examiner

METHODS FOR IMPROVED PROVISIONING OF INFORMATION TECHNOLOGY RESOURCES AND DEVICES THEREOF

This application claims the benefit of Indian Patent Application Filing No. 1315/CHE/2012, filed Apr. 2, 2012, entitled "Method and System for Optimizing IT Resource Usage in an Enterprise," which is hereby incorporated by reference in its entirety.

FIELD

This technology generally relates to improved methods, non-transitory computer readable medium, and apparatuses for provisioning information technology (IT) resources to users of client computing devices associated with an enterprise and, more particularly, to optimizing the provisioning of IT resources dynamically and based on correlations between utilization of the IT resources and demographic attributes associated with the users.

BACKGROUND

Purchasing costs and licensing fees for software and hardware information technology (IT) resources can be a significant portion of an enterprise's budget. In order to reduce IT-related expenses, some enterprises provision a minimum profile of required IT resources to users in a request and review system. In this system, any additional IT resources which are needed are requested by users on an as-needed basis. The IT resources are provisioned upon receiving and approving the requests from the users. Unfortunately, this deliberate under-provisioning of IT resources is inefficient, slow, and unmanageable, particularly in enterprises with a large number of users, resulting in reduced productivity and increased overhead.

Instead of provisioning a minimum profile to each user, some enterprises provision IT resources to users based on a categorization of the users into a fixed role within the enterprise. Such role based access control (RBAC) can lead to both over-provisioning and under-provisioning, since all users associated with each of the roles will not likely have the same IT resource requirements.

In many enterprises, user roles change over time as users move departments, locations, or positions, for example. In a request and review system, users may have previously requested and been provisioned IT resource(s) that they are not currently using. In an RBAC approach, users may be provisioned IT resource(s) based on a role they no longer have. Accordingly, current provisioning methods can result in many users having provisioning profiles that are not aligned with their current requirements or usage. Such suboptimal provisioning of IT resources can result in increased cost to the enterprise, which is undesirable.

SUMMARY

A method for improved provisioning of information technology (IT) resources includes obtaining, with an IT resource optimization apparatus, for each of a plurality of users of a plurality of IT resources, a plurality of demographic attributes and an entitlement record comprising at least an indication of an assigned one or more of the plurality of IT resources. For each of the plurality of demographic attributes, which of one or more of the plurality of IT resources assigned to a threshold number of the plurality of users sharing the demographic attribute are identified with the IT resource optimization apparatus. For each of the plurality of users, a recommended provisioning profile is generated, with the IT resource optimization apparatus, based on the identified one or more of the plurality of IT resources. For one or more of the plurality of users, one or more provisioning recommendations are determined, with the IT resource optimization apparatus, based on a comparison of the recommended provisioning profile for the one or more users to the entitlement record for the one or more users. The one or more determined provisioning recommendations are output with the IT resource optimization apparatus.

A non-transitory computer readable medium having stored thereon instructions for improved provisioning of IT resources comprises machine executable code which when executed by a processor, causes the processor to perform steps including obtaining for each of a plurality of users of a plurality of IT resources, a plurality of demographic attributes and an entitlement record comprising at least an indication of an assigned one or more of the plurality of IT resources. For each of the plurality of demographic attributes, which of one or more of the plurality of IT resources assigned to a threshold number of the plurality of users sharing the demographic attribute are identified. For each of the plurality of users, a recommended provisioning profile is generated based on the identified one or more of the plurality of IT resources. For one or more of the plurality of users, one or more provisioning recommendations are determined based on a comparison of the recommended provisioning profile for the one or more users to the entitlement record for the one or more users. The one or more determined provisioning recommendations are output.

An IT resource optimization apparatus includes a memory and a processor coupled to the memory and configured to execute programmed instructions stored in the memory, including obtaining for each of a plurality of users of a plurality of IT resources, a plurality of demographic attributes and an entitlement record comprising at least an indication of an assigned one or more of the plurality of IT resources. For each of the plurality of demographic attributes, which of one or more of the plurality of IT resources assigned to a threshold number of the plurality of users sharing the demographic attribute are identified. For each of the plurality of users, a recommended provisioning profile is generated based on the identified one or more of the plurality of IT resources. For one or more of the plurality of users, one or more provisioning recommendations are determined based on a comparison of the recommended provisioning profile for the one or more users to the entitlement record for the one or more users. The one or more determined provisioning recommendations are output.

This technology provides a number of advantages including methods, non-transitory computer readable medium, and apparatuses that more effectively provision IT resources to users of computing devices associated with an enterprise. With this technology, IT resources are provisioned dynamically, based on usage, and correlations between current provisioning profiles and demographic attributes of the users. Accordingly, IT-related expenses can be reduced and provisioning of IT resources can be more aligned with the requirements of the computing device users.

DETAILED DESCRIPTION

Figure 1:
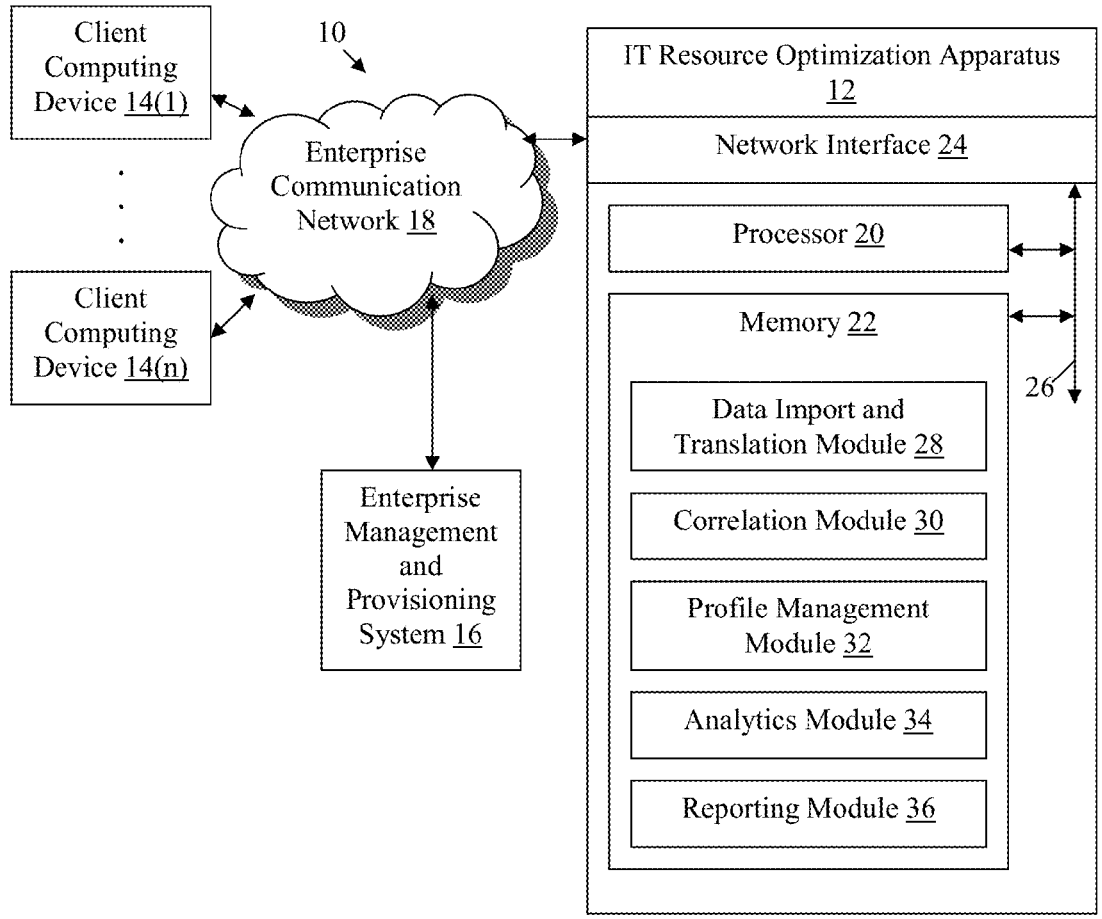
FIG. 1 is a block diagram of an environment with an exemplary IT resource optimization apparatus.

An environment 10 with an exemplary information technology (IT) resource optimization apparatus 12, client computing devices 14(1)-14(n), and an enterprise management and provisioning system 16, coupled to an enterprise communication network 18 is illustrated in FIG. 1. Other numbers and types of systems, devices, and/or elements in other configurations and environments with other communication network topologies can also be used. This technology provides a number of advantages including methods, non-transitory computer readable medium, and apparatuses that facilitate improved provisioning of IT resources for users of client computing devices associated with an enterprise.

Referring more specifically to FIG. 1, the client computing devices 14(1)-14(n) enable a user to request information from and store information on one or more server computing devices (not shown) associated with the enterprise communication network 18. The client computing devices 14(1)-14(n) can optionally communicate with server computing devices external to the enterprise communication network 18, such as to retrieve web pages over the Internet, for example.

The client computing devices 14(1)-14(n) include a processor, a memory, a user input device, a display, and a network interface, which are coupled together by a bus or other link, although one or more of client computing devices 14(1)-14(n) can include other numbers and types of components, parts, devices, systems, and elements in other configurations. The processor in each of the client computing devices 14(1)-14(n) can execute a program of instructions for one or more aspects of the present invention as described and illustrated herein, although the processors could execute other numbers and types of programmed instructions.

The memory in each of the client computing devices 14(1)-14(n) stores these programmed instructions for one or more aspects of the present invention as described and illustrated herein, although some or all of the programmed instructions could be stored and/or executed elsewhere. The programmed instructions can be in the form of computer programs, applications, or other IT resources that are accessible to users of the client computing devices 14(1)-14(n). These computer program IT resources can be accessed by some of the users based on a profile or entitlement record associated with the users, as described and illustrated in more detail later. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in the client computing devices 14(1)-14(n).

The user input device in each of the client computing devices 14(1)-14(n) can be used to input selections, although the user input devices could be used to input other types of requests and data. The user input devices can include keypads or touch screens, although other types and numbers of user input devices can be used. The display in each of the client computing devices 14(1)-14(n) can be used to show data and information to the user, in response to a request for the information. The network interface in each of the client computing devices 14(1)-14(n) can be used to operatively couple and communicate between the client computing devices 14(1)-14(n) and other network devices accessible via the enterprise communication network 18.

The enterprise management and provisioning system 16 includes at least a processor, a memory, and a network interface, which are coupled together by a bus or other link, although the enterprise management and provisioning system 16 can include other numbers and types of components, parts, devices, systems, and elements in other configurations. The processor in the enterprise management and provisioning system 16 can execute a program of instructions for one or more aspects of the present invention as described and illustrated herein, although the processor could execute other numbers and types of programmed instructions.

The memory in the enterprise management and provisioning system 16 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in the enterprise management and provisioning system 16. The network interface in the enterprise management and provisioning system 16 can be used to operatively couple and communicate between the enterprise management and provisioning system 16 and at least the IT resource optimization apparatus 12 via the communication network 18.

In this example, the enterprise management and provisioning system 16 maintains and provides information including demographic attributes associated with each of the users of the client computing devices 14(1)-14(n) in the form of human resource profiles, for example. The demographic attributes can be stored in the memory of the enterprise management and provisioning system 16. The demographic attributes can include a user's name, office location, department, function, role, and/or reporting structure, for example, although other demographic attributes can also be stored by the memory in the enterprise management and provisioning system 16. In other examples, the demographic attributes are stored by a human resource management system separate from the enterprise management and provisioning system 16 but also coupled to the enterprise communication network 18, although the demographic attributes can also be stored elsewhere.

The enterprise management and provisioning system 16 also maintains and provides IT resource entitlement records for each of the users of the client computing device 14(1)-14(n), although the system can maintain and provide other types of records and information. The entitlement records can be stored in the memory of the enterprise management and provisioning system 16 and can include an indication of the IT resources that are currently provisioned to an associated user. In some examples, the entitlement records are used to provide access to the IT resources identified therein for a user upon the user logging in to the enterprise management and provisioning system 16, or another authentication network device, for example. In other examples, the entitlement records are stored by an IT resource provisioning system separate from the enterprise management and provisioning system 16 but also coupled to the enterprise communication network 18, although the entitlement records can also be stored elsewhere.

Additionally, the enterprise management and provisioning system 16 maintains and provides information regarding IT resources such as associated licenses, available versions, and usage data for the users of the client computing device 14(1)-14(n), although the system can maintain and provide other types of information. Other information can include restricted IT resources requiring special approval prior to provisioning. The information regarding the IT resources can be stored in the memory of the enterprise management and provisioning system 16. In other examples, the information regarding the IT resources is stored by an asset management system separate from the enterprise management and provisioning system 16 but also coupled to the enterprise communication network 18, although the information regarding the IT resources can also be stored elsewhere.

The enterprise management and provisioning system 16 further maintains and provides information regarding service requests including task orders to be carried out in the course of provisioning IT resources to users of the client computing devices 14(1)-14(n), although again the system can maintain and provide other types of information. The information regarding service requests and task orders can be stored in the memory of the enterprise management and provisioning system 16. In other examples, the information regarding service requests and task orders is stored by an IT service management system separate from the enterprise management and provisioning system 16 but also coupled to the enterprise communication network 18, although the information regarding service requests and task orders can also be stored elsewhere.

The IT resource optimization apparatus 12 includes a processor 20, a memory 22, and a network interface 24, which are coupled together by a bus 26 or other link, although other numbers and types of components, parts, devices, systems, and elements in other configurations and locations can be used. The processor 20 in the IT resource optimization apparatus 12 executes a program of stored instructions for one or more aspects of the present invention, as described and illustrated by way of the embodiments herein, although the processor 20 could execute other numbers and types of programmed instructions.

The memory 22 in the IT resource optimization apparatus 12 stores these programmed instructions for one or more aspects of the present invention, as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 20, can be used for the memory 22 in the IT resource optimization apparatus 12. The programmed instructions can be stored in the memory 22 in one or more modules, examples of which are shown in FIG. 1, although the programmed instructions can also be stored elsewhere and the memory 22 can also include other modules.

The memory 22 in the IT resource optimization apparatus 12 includes a data import and translation module 28 configured to obtain information from external systems, such as the enterprise management and provisioning system 16 in this example, although this memory and/or module can store other application and/or data, can have other types and numbers of functions, and these instructions can be executed in other manners. More specifically, the data import and translation module 28 can be configured to obtain information including demographic attributes, entitlement records, IT resource information and usage data, for example, associated with users of the client computing device 14(1)-14(n), although other information can also be obtained by the data import and transformation module 28. The data import and translation module 18 is further configured to transform the obtained data into a format that the IT resource optimization apparatus 12 is configured to process, such as one or more tables or one or more spreadsheets, for example, as described and illustrated later.

The memory 22 in the IT resource optimization apparatus 12 further includes a correlation module 30 in this example. The correlation module 30 is configured to create and maintain correlation tables including information regarding relationships between demographic attributes and entitlement records for one or more users in this example, as described and illustrated in more detail later, although this module can have other types and numbers of functions and these instructions can be executed in other manners. The information included in the correlation tables can be obtained by the data import and transformation module 28, for example, as described and illustrated earlier.

In this example, the memory 22 in the IT resource optimization apparatus 12 further includes a profile management module 32 configured to create technical profiles for users of the client computing device 14(1)-14(n), although this module can have other types and numbers of functions and these instructions can be executed in other manners. More specifically, the profile management module 32 is configured to create the technical profiles based on the demographic attributes associated each of the uses and the correlation tables created and maintained by the correlation module 30, as described and illustrated in more detail later. Additionally, the profile management module 32 can be configured to perform consolidation of provisioned IT resources and prepare and send task orders to the enterprise management and provisioning system 16, for example, as also described and illustrated in more detail later.

The memory 22 in the IT resource optimization apparatus 12 further stores an analytics module 34 in this example. The analytics module 34 is configured to perform intelligent analysis during creation and updating of the correlation tables and/or technical profiles and/or creation of reports, although this module can have other types and numbers of functions and these instructions can be executed in other manners.

In this example, the memory 22 in the IT resource optimization apparatus 12 also stores a reporting module 36. The reporting module is configured to prepare various reports useful for optimizing utilization of IT resources for an enterprise, although this module can have other types and numbers of functions and these instructions can be executed in other manners. More specifically, the reporting module 36 is configured to create reports on IT resource usage and/or cost of IT resource utilization per IT resource, user, and/or demographic attribute or for an enterprise as a whole, for example, and including an indication of opportunities for optimization.

The network interface 24 in the IT resource optimization apparatus 12 is used to operatively couple and communicate between the IT resource optimization apparatus 12, the client computing devices 14(1)-14(n), and the enterprise management and provisioning system 16 via the enterprise communication network 18, although other types and numbers of communication networks 18 with other types and numbers of connections and configurations can be used. Additionally, the enterprise communication network 18 can include one or more local area networks (LANs) and/or wide area networks (WANs), for example. By way of example only, the communication networks can use TCP/IP over Ethernet and industry-standard protocols.

Although embodiments of the IT resource optimization apparatus 12, the client computing devices 14(1)-14(n), and the enterprise management and provisioning system 16, are described and illustrated herein, each of the IT resource optimization apparatus 12, the client computing devices 14(1)-14(n), and the enterprise management and provisioning system 16 can be implemented on any suitable computer apparatus or computing device. It is to be understood that the apparatuses and devices of the embodiments described herein are for exemplary purposes, as many variations of the specific hardware and software used to implement the embodiments are possible, as will be appreciated by those skilled in the relevant art(s).

Furthermore, each of the devices of the embodiments may be conveniently implemented using one or more general purpose computers, microprocessors, digital signal processors, and micro-controllers, programmed according to the teachings of the embodiments, as described and illustrated herein, and as will be appreciated by those ordinary skill in the art.

The embodiments may also be embodied as one or more non-transitory computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
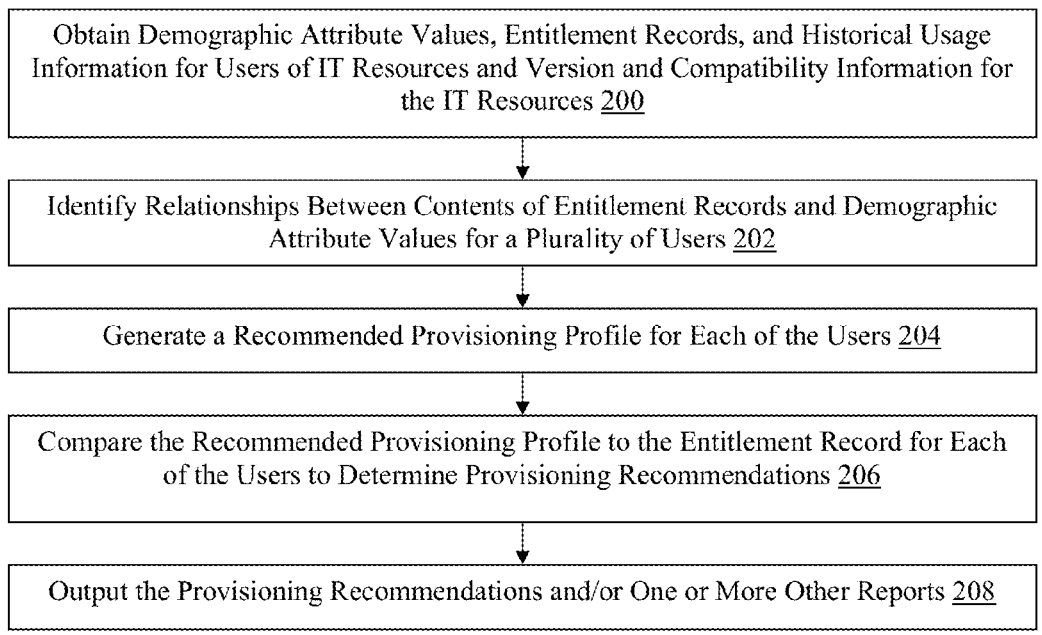
FIG. 2 is a flowchart of an exemplary method for improved provisioning of IT resources.

An exemplary method for improved provisioning of IT resources will now be described with reference to FIGS. 1-3. In this example, in step 200 the IT resource optimization apparatus 12 obtains demographic attribute values and entitlement records for a plurality of users of the client computing devices 14(1)-14(n). Optionally, the IT resource optimization apparatus 12 further obtains historical IT resource usage data and/or a cost for each of the IT resources (e.g. individual license fee). In this example, the IT resource optimization apparatus 12 obtains the information from the enterprise management and provisioning system 16, although some or all of the information can be obtained from other sources. In some examples, the information is obtained in step 200 in different formats (e.g. spreadsheets, documents, lists, tables, and/or comma-separated values (CSVs)). Accordingly, in these examples, the IT resource optimization apparatus 12 translates the information into a common or uniform format.

The obtained demographic attributes can include a location, role, function, position, title, or department for the users of the client computing devices 14(1)-14(n). Additionally, the IT resource optimization apparatus 12 can obtain unique identifier(s) (e.g. employee ID and/or login ID) along with the demographic attribute values and entitlement records that can be used as a key to the demographic attribute values and assigned IT resources associated with each user. In this example, the entitlement records indicate the IT resources currently assigned to each user of the client computing devices 14(1)-14(n). Exemplary entitlement record entries obtained by the IT resource optimization apparatus 12 from the enterprise management and provisioning system 16 are set forth below in Table 1.

TABLE 1

| Login ID | IT Resource Name | IT Resource Version |
|---|---|---|
| 253524 | Adobe Reader | 9 |
| 253524 | FactSet for Windows | 2007.5.98.27 |
| 253524 | Acrobat Reader | 8.5.0.909i ent |
| 253524 | NetMeeting | 3.01 |
| 253524 | Office | 2003 std sp2 |
| 256435 | Organization Plus | 7.0.0 |
| 256435 | Acrobat Reader | 7.0.2 std |
| 256435 | Cognos Cookie | 1.01 |
| X100 | Ysrt | 2.0 |
| X100 | Tres | 1.01 |
| X102 | Ysrt | 2.0 |

Optionally, for at least some of the IT resources identified in the entitlement records that are software applications, version and compatibility information for the IT resources is also obtained by the IT resource optimization apparatus 12 in step 200. The version and compatibility information can be used as described and illustrated in more detail later with reference to step 208. Exemplary version and compatibility information obtained by the IT resource optimization apparatus 12 from the enterprise management and provisioning system 16 is set forth in Table 2.

TABLE 2

| IT Resource Title | IT Resource Version | Compatible OS |
|---|---|---|
| Acrobatreader_Jap | 9 | Xp, Vista |
| Visioviewer | 2007.5.98.27 | Xp, Win 7, Win 8 |
| TKAccess | 8.5.0.909i ent | Xp |
| Visio | 3.01 | Xp, Win 7, Win 8 |
| SAP | 2003 std sp2 | Xp, Win 7, Win 8 |
| CRM | 7.0.0 | Xp |
| Mailmerge | 7.0.2 std | Xp, Win 7, Win 8 |

Optionally, in some examples, the IT resource optimization apparatus 12 further obtains, in step 200, an indication of one or more IT resources requiring approval prior to assigning to a user. In these examples, the IT resource optimization apparatus 12 stores the indications of the IT resources in an exclusion list in the memory 22. The IT resource optimization apparatus 12 then determines whether any of the obtained entitlement records includes one or more of the IT resources indicated in the exclusion list and removes those IT resources from the obtained entitlement records. Because those IT resources require special approval, they can be excluded from use in the method illustrated in FIG. 2.

In step 202, the IT resource optimization apparatus 12 identifies relationships between the contents of the entitlement records and the demographic attribute values obtained in step 200. In this example, the IT resource optimization apparatus 12 can iterate through each demographic attribute and determine which of the IT resources are currently assigned to a threshold number of users sharing a value of the demographic attribute. The threshold number of users can be defined by an administrator and can be indicated as a percentage (e.g. 80%), such as a percentage greater than 50% and indicated a majority, for example, although other thresholds and percentages can also be used. Exemplary correlation tables including the relationships identified in step 202 for location, department, and function demographic attributes are set forth in Table 3, Table 4, and Table 5, respectively.

TABLE 3

| Location_Tokyo | Location_New York | Location_Frankfurt | Location_Mumbai |
| --- | --- | --- | --- |
| AcrobatReader_Jap | Courage 1.0 | Distrub | Valuation3 |
| Visioviewer | NYAccess | FRAccess | MBAccess |
| TKAccess | CRM | | Amchi |

TABLE 4

| Dept_PMO | Dept_FrontOffice | Dept_Training | Dept_Support |
| --- | --- | --- | --- |
| MS Project | Visioviewer | MsAccess | MsAccess |
| AbInitio Online | CRM | | Visioviewer |
| AbandonedProperties | Mailmerge | SchoolatDesk | ACAPS Receipt |
| Separator Sheets | | | and Routing |
| Utility | | | |
| MsAccess | | | |

TABLE 5

| Function_admin | Function_Manager | Function_Developer | Function_Ops |
| --- | --- | --- | --- |
| AcrobatReader_Eng | Visio | JDK | Dashboard |
| MSOffice | SAP | VisualStudio | |

Referring to Table 3, in this example, a threshold number of users sharing the value "Tokyo" for the location demographic attribute have been assigned IT resources "AcrobatReader_Jap," "Visioviewer," and "TKAccess" according to the obtained entitlement records for those users. Referring to Table 4, a threshold number of users sharing the value "FrontOffice" for the department demographic attribute have been assigned IT resources "Visioviewer," "CRM," and "Mailmerge." Additionally, in this example, a threshold number of users sharing the value "Manager" for the function demographic attribute have been assigned IT resources "Visio" and "SAP," as indicated in Table 5.

Optionally, in examples in which the historical usage data for the IT resources is obtained in step 200, the IT resource optimization apparatus 12 can remove those IT resources not utilized by a user for a threshold period of time from the entitlement record associated with the user prior to identifying the relationships in step 202. In these examples, the identified relationships will be more appropriately limited to those utilized IT resources exhibiting a correlation with a demographic attribute instead of including IT resources that may be assigned but not utilized by the user(s). The historical usage data can also be organized based on the unique identifier(s) for each of the users that are used as a key to the demographic attribute values and the entitlement record entries. With the unique identifier(s), the IT resource optimization apparatus 12 can determine which entitlement record entries should be removed for a user based on a lack of usage by the user of an IT resource identified in the entry.

In step 204, the IT resource optimization apparatus 12 generates a recommended provisioning profile for each of the users of the client computing devices 14(1)-14(n). In this example, the IT resource optimization apparatus 12 uses the relationships, identified in step 202, and the demographic attribute values associated with each user, obtained in step 200, to determine a recommended provisioning profile for each of the users. The recommended provisioning profile for a user can include an indication of IT resources assigned to, and optionally utilized by, a threshold number of users sharing a value for each of the demographic attributes associated with the user. Additionally, the recommended provisioning profile for each of the users can be organized according to the format of the entitlement records obtained in step 200, and can include at least a unique identifier for a user and an indication of IT resources recommended for the user.

Figure 3:
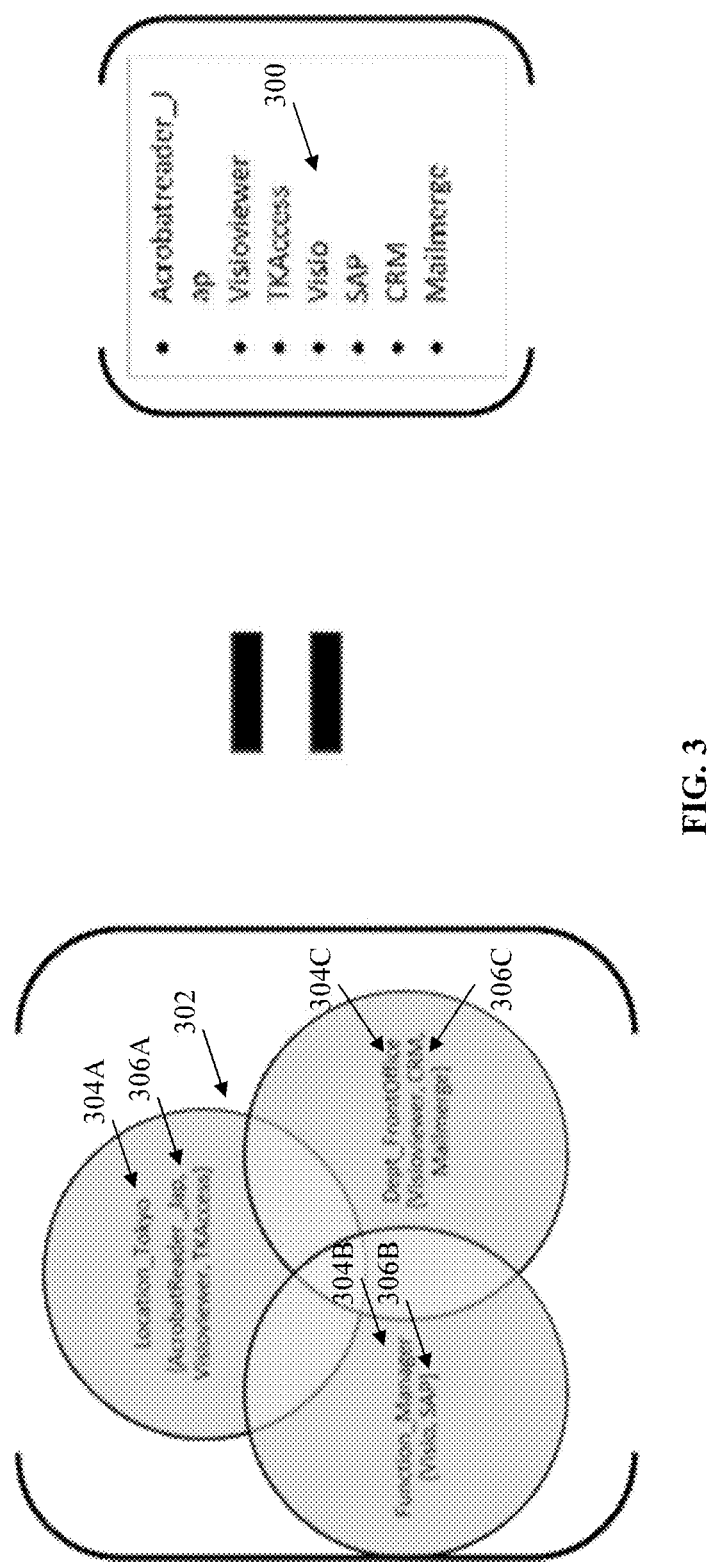
FIG. 3 is a Venn diagram and chart illustrating an example of a plurality of IT resources that can be included in a provisioning profile.

Referring to FIG. 3, a plurality of IT resources 300 that can be included in an exemplary recommended provisioning profile is illustrated. The recommended provisioning profile is generated using the relationships identified in step 202 which, in this example, are included in the exemplary correlation tables set forth in Tables 3-5 and reproduced in the Venn diagram 302. In this example, the user has a location demographic attribute value 304A of "Tokyo," a function demographic attribute value 304B of "Manager" and a department demographic attribute value 304C of "FrontOffice." The IT resources 306A, 306B, and 306C having a significant or correlated relationship with the demographic attribute values 304A, 304B, and 304C, as described and illustrated earlier, are also indicated.

In this example, the plurality of IT resources 300 that can be included in the recommended provisioning profile for the user includes all of the IT resources 306A, 306B, and 306C. In order to generate the recommended provisioning profile, the IT resource optimization apparatus 12 can include the IT resources 300 in a spreadsheet, table, or database, for example, as associated with a unique identifier for the user. Optionally, the recommended provisioning profile for each user can be combined with the demographic attribute values associated with each user into a complete profile for each of the users, which is stored in the memory 22 and/or communicated via the enterprise communication network 18 to the enterprise management and provisioning system 16, for example.

In step 206, the IT resource optimization apparatus 12 compares the recommended provisioning profile, generated in step 204, to the entitlement record, obtained in step 200, for each of the users to determine one or more provisioning recommendations. In examples in which the recommended provisioning profiles and the entitlement records are organized based on unique identifiers for the users, the IT resource optimization apparatus can compare the IT resources associated with each unique identifier in the recommended provisioning profiles and the entitlement records to identify any differences. The IT resource optimization apparatus 12 can then determine the provisioning recommendations based on the identified differences.

An IT resource included in an entitlement record for a user, but not included in the recommended provisioning profile for the user, can indicate a likelihood that the IT resource does not need to be assigned to the user. Conversely, an IT resource that is included in the recommended provisioning profile, but not included in the entitlement record for the user, can indicate a likelihood that the IT resource should be assigned to the user.

In step 208, the IT resource optimization apparatus 12 outputs the provisioning recommendations determined in step 206. The provisioning recommendations can be output by the IT resource optimization apparatus 12 to the enterprise management and provisioning apparatus 16 via the enterprise communication network 18, for example, although other methods of outputting the provisioning recommendations can also be used. In some examples, the provisioning recommendations are output in the form of task orders that are reviewable by an administrator of the enterprise management and provisioning apparatus 16. Upon review and approval of the task orders, the administrator can modify the entitlement record for one or more users to reflect the provisioning recommendations for those users. In other examples, the entitlement records are modified automatically by the enterprise management and provisioning system 16 based on the determined provisioning recommendations.

Optionally, the IT resource optimization apparatus 12 can be configured to carry out steps 200-208 periodically and/or dynamically whenever a change in user demography, one or more entitlement records, and/or IT resources (e.g. a new software application is introduced) is determined by the IT resource optimization apparatus 12. In this example, the enterprise management and provisioning system 16 can indicate a change has occurred to the IT resource optimization apparatus 12, which can initiate obtaining at least the demographic attribute values or entitlement records in step 200, as described and illustrated earlier. Accordingly, in this example, the IT resource optimization apparatus 12 advantageously operates dynamically to modify the provisioning of IT resources for users of the client computing devices 14(1)-14(n) associated with an enterprise.

Optionally, in step 208, the IT resource optimization apparatus also generates and outputs one or more reports. The reports can be automatically generated or initiated by an administrator of the IT resource optimization apparatus 12, for example. Reports can include a list of all provisioning recommendations determined in step 206, cost implications of implementing the provisioning recommendation(s) determined in step 206, IT resource cost for user(s) or demographic attribute value(s) based on the obtained entitlement record(s), utilization of IT resource(s) for user(s) and/or demographic attribute value(s), and total IT-related costs for an enterprise, for example, although other reports can also be output by the IT resource optimization apparatus 12 in step 208.

Optionally, in examples in which version and compatibility information is obtained, in step 200, by the IT resource optimization apparatus 12 for at least some of the IT resources, the IT resource optimization apparatus 12 can output a report, in step 208, including the migration readiness of the user(s). The migration can be to desktop virtualization or to a different operating system platform, for example. The compatibility of a plurality of IT resources is set forth in Table 2. With the entitlement records, or the recommended provisioning profiles, and the compatibility information, the IT resource optimization apparatus 12 can determine the compatibility of each of the IT resources assigned to a user.

In the exemplary plurality of IT resources 300 that can be included in an exemplary recommended provisioning profile shown in FIG. 3, and the compatibility information set forth in Table 2, the IT resource optimization apparatus 12 can determine that the associated user would be 4/8 or 50% ready for migration to Window 8 ("Win 8") from Windows XP ("XP") if the entitlement record for the user is modified to reflect the recommended provisioning profile generated in step 206. In this example, half of the IT resources assigned to the user are compatible with Windows 8. In other examples, a report including the migration readiness of one of the demographic attribute values (e.g. a specific location, function, or department) can also be output by the IT resource optimization apparatus 12. In order to output other migration readiness reports, the IT resource optimization apparatus 12 can use the demographic attribute values and entitlement records, obtained in step 200, or recommended provisioning profiles, generated in step 204.

By this technology, an enterprise can dynamically optimize the provisioning of IT resources to users of client computing devices 14(1)-14(n) associated with the enterprise based on assignment to and, optionally, utilization of, the IT resources by a threshold number of users sharing the same demographic attribute value. With this technology, a recommended provisioning profile is generated and compared with an entitlement record including current assignment of IT resources for each user. Differences between the recommended provisioning profile(s) and entitlement record(s) for the user(s) can be output to allow automatic or manual modification of the entitlement record(s). Thereby, IT resource provisioning is optimized and aligned with likely requirements of the users and, accordingly, IT-related costs for the enterprise can be reduced.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for improved provisioning of information technology (IT) resources, the method comprising:

obtaining, by an IT resource optimization apparatus, a plurality of demographic attributes, unique identifiers, and entitlement records associated with a plurality of users of a plurality of IT resources, the entitlement records comprising an indication associated with current assignment of one or more of the plurality of IT resources, the unique identifiers corresponding to a key for the plurality of demographic attributes and the assigned plurality of IT resources;

identifying, by the IT resource optimization apparatus and from the plurality of IT resources, restricted IT resources requiring approval prior to being assigned to one or more of the plurality of users, based on the indication included in the entitlement records;

removing, by the IT resource optimization apparatus, from the entitlement records, the restricted IT resources and unutilized IT resources within the plurality of IT resources that are not utilized for a threshold time period by at least one of the plurality of users;

creating, by the IT resource optimization apparatus, a correlation table comprising relationships between the plurality of demographic attributes and the entitlement records after removing the restricted IT resources and the unutilized IT resources;

identifying, by the IT resource optimization apparatus, based on the relationships in the correlation table, one or more of the plurality of IT resources that are currently assigned to a threshold number of the plurality of users sharing the demographic attribute;

generating, by the IT resource optimization apparatus, for at least one of the plurality of users, a recommended provisioning profile based on a correlation of the identified one or more of the plurality of IT resources and one or more of the demographic attributes associated with the at least one of the plurality of users; and determining, by the IT resource optimization apparatus, for the at least one of the plurality of users, one or more provisioning recommendations based on a comparison of the recommended provisioning profile for the at least one of the plurality of users to the entitlement record for the at least one of the plurality of users.

2. The method of claim 1, further comprising identifying, based on historical usage information for the plurality of IT resources, the unutilized IT resources not used for the threshold time period by a threshold number of the plurality of users sharing demographic attributes.

3. The method of claim 1, further comprising:
determining, by the IT resource optimization apparatus, when a change has occurred for at least one of the plurality of demographic attributes or in the entitlement record for at least one of the plurality of users; and
repeating, by the IT resource optimization apparatus, the identifying, generating, determining, and outputting, when the determining indicates that the change has occurred for at least one of the plurality of demographic attributes or in the entitlement record for at least one of the plurality of users.

4. The method of claim 1, wherein the demographic attributes comprise a location, role, function, position, title, or department and the demographic attributes and entitlement record for each of the plurality of users are each associated with a same unique identifier for the user.

5. The method of claim 1, further comprising:
storing, by the IT resource optimization apparatus, the indication of the restricted IT resources in an exclusion list, wherein the restricted IT resources are removed from the entitlement records using the exclusion list.

6. The method of claim 1 wherein the plurality of IT resources are software applications, the obtained entitlement record for each of the plurality of users further comprises an indication of a version of the one or more of the plurality of software applications that are assigned to the user, and the method further comprises:
obtaining, by the IT resource optimization apparatus, version and compatibility information for each of the plurality of IT resources; and
determining, by the IT resource optimization apparatus, a migration readiness of one of the plurality of users based on the version of the one or more of the plurality of software applications that are assigned to the user and the compatibility information.

7. The method of claim 1 further comprising:
obtaining, by the IT resource optimization apparatus, a cost for each of the plurality of IT resources; and
determining, by the IT resource optimization apparatus, a total IT resource cost for at least one of the plurality of users or at least one demographic attribute based on the obtained cost and one or more of the entitlement records.

8. A non-transitory computer readable medium having stored thereon instructions for improved provisioning of information technology (IT) resources comprising machine executable code which when executed by a processor, causes the processor to perform steps comprising:
obtaining a plurality of demographic attributes, unique identifiers, and entitlement records associated with a plurality of users of a plurality of IT resources, the entitlement records comprising an indication associated with current assignment of one or more of the plurality of IT resources, the unique identifiers corresponding to a key for the plurality of demographic attributes and the assigned plurality of IT resources;
identifying from the plurality of IT resources, restricted IT resources requiring approval prior to being assigned to one or more of the plurality of users, based on the indication included in the entitlement records;
removing from the entitlement records, the restricted IT resources and unutilized IT resources within the plurality of IT resources that are not utilized for a threshold time period by at least one of the plurality of users;
creating a correlation table comprising relationships between the plurality of demographic attributes and the entitlement records after removing the restricted IT resources and the unutilized IT resources;
identifying based on the relationships in the correlation table, one or more of the plurality of IT resources that are currently assigned to a threshold number of the plurality of users sharing the demographic attribute;
generating for at least one of the plurality of users, a recommended provisioning profile based on a correlation of the identified one or more of the plurality of IT resources and one or more of the demographic attributes associated with the at least one of the plurality of users; and
determining for the at least one of the plurality of users, one or more provisioning recommendations based on a comparison of the recommended provisioning profile for the at least one of the plurality of users to the entitlement record for the at least one of the plurality of users.

9. The medium of claim 8 further comprising identifying, based on historical usage information for the plurality of IT resources, the unutilized IT resources not used for the threshold time period by a threshold number of the plurality of users sharing demographic attributes.

10. The medium of claim 8 further comprising machine executable code which, when executed by the processor, causes the processor to perform steps further comprising:
determining when a change has occurred for at least one of the plurality of demographic attributes or in the entitlement record for at least one of the plurality of users; and
repeating the identifying, generating, determining, and outputting, when the determining indicates that the change has occurred for at least one of the plurality of demographic attributes or in the entitlement record for at least one of the plurality of users.

11. The medium of claim 8 wherein the demographic attributes comprise a location, role, function, position, title, or department and the demographic attributes and entitlement record for each of the plurality of users are each associated with a same unique identifier for the user.

12. The medium of claim 8 further comprising machine executable code which, when executed by the processor, causes the processor to perform steps further comprising:
storing the indication of the restricted IT resources in an exclusion list, wherein the restricted IT resources are removed from the entitlement records using the exclusion list.

13. The medium of claim 8 wherein the plurality of IT resources are software applications, the obtained entitlement record for each of the plurality of users further comprises an indication of a version of the one or more of the plurality of software applications that are assigned to the user, and the medium further comprises machine executable code which, when executed by the processor, causes the processor to perform steps further comprising:

obtaining version and compatibility information for each of the plurality of IT resources; and determining a migration readiness of one of the plurality of users based on the version of the one or more of the plurality of software applications that are assigned to the user and the compatibility information.

14. The medium of claim 8 further comprising machine executable code which, when executed by the processor, causes the processor to perform steps further comprising:

obtaining a cost for each of the plurality of IT resources; and determining a total IT resource cost for at least one of the plurality of users or for a value of at least one demographic attribute based on the obtained cost and one or more of the entitlement records.

15. An information technology (IT) resource optimization apparatus, comprising:

a memory; and a processor coupled to the memory and configured to execute programmed instructions comprising and stored in the memory to:

obtain a plurality of demographic attributes, unique identifiers, and entitlement records associated with a plurality of users of a plurality of IT resources, the entitlement records comprising at least an indication associated with current assignment of one or more of the plurality of IT resources, the unique identifiers corresponding to a key for the plurality of demographic attributes and the assigned plurality of IT resources;

identify from the plurality of IT resources, restricted IT resources requiring approval prior to being assigned to one or more of the plurality of users, based on the indication included in the entitlement records;

remove from the entitlement records, the restricted IT resources and unutilized IT resources within the plurality of IT resources that are not utilized for a threshold time period by at least one of the plurality of users;

create a correlation table comprising relationships between the plurality of demographic attributes and the entitlement records after removing the restricted IT resources and the unutilized IT resources;

identify based on the relationships in the correlation table, one or more of the plurality of IT resources that are currently assigned to a threshold number of the plurality of users sharing the demographic attribute;

generate for at least one of the plurality of users, a recommended provisioning profile based on a correlation of the identified one or more of the plurality of IT resources and one or more of the demographic attributes associated with the at least one of the plurality of users; and determine for the at least one of the plurality of users, one or more provisioning recommendations based on a comparison of the recommended provisioning profile for the at least one of the plurality of users to the entitlement record for the at least one of the plurality of users.

16. The apparatus of claim 15 wherein the processor is further configured to execute one or more additional programmed instructions comprising and stored in the memory to identify, based on historical usage information for the plurality of IT resources, the unutilized IT resources not used for the threshold time period by a threshold number of the plurality of users sharing demographic attributes.

17. The apparatus of claim 15 wherein the processor is further configured to execute one or more additional programmed instructions comprising and stored in the memory:

determine when a change has occurred for at least one of the plurality of demographic attributes or in the entitlement record for at least one of the plurality of users; and repeat the identifying, generating, determining, and outputting, when the determining indicates that the change has occurred for at least one of the plurality of demographic attributes or in the entitlement record for at least one of the plurality of users.

18. The apparatus of claim 15 wherein the demographic attributes comprise a location, role, function, position, title, or department and the demographic attributes and entitlement record for each of the plurality of users are each associated with a same unique identifier for the user.

19. The apparatus of claim 15 wherein the processor is further configured to execute one or more additional programmed instructions comprising and stored in the memory:

store the indication of the one or more of the plurality of restricted IT resources in an exclusion list, wherein the restricted IT resources are removed from the entitlement records using the exclusion.

20. The apparatus of claim 15 wherein the plurality of IT resources are software applications, the obtained entitlement record for each of the plurality of users further comprises an indication of a version of the one or more of the plurality of software applications that are assigned to the user, and the processor is further configured to execute one or more additional programmed instructions comprising and stored in the memory to:

obtain version and compatibility information for each of the plurality of IT resources; and determine a migration readiness of one of the plurality of users based on the version of the one or more of the plurality of software applications that are assigned to the user and the compatibility information.

21. The apparatus of claim 15 wherein the processor is further configured to execute one or more additional programmed instructions comprising and stored in the memory to:

obtain a cost for each of the plurality of IT resources; and determine a total IT resource cost for at least one of the plurality of users or for a value of at least one demographic attribute based on the obtained cost and one or more of the entitlement records.

* * * * *